United States Patent [19]

Seki et al.

[11] Patent Number: 5,237,665
[45] Date of Patent: Aug. 17, 1993

[54] SYSTEM FOR CHANGING AN NC PROGRAM STARTING CHARACTER STRING TO ONE RECOGNIZABLE TO A PARTICULAR NC APPARATUS

[75] Inventors: Masaki Seki; Takashi Takegahara, both of Tokyo; Katsunobu Yamaki, Yamanashi, all of Japan

[73] Assignee: Fanuc Ltd., Minamitsuru, Japan

[21] Appl. No.: 348,582

[22] PCT Filed: Aug. 31, 1988

[86] PCT No.: PCT/JP88/00865

§ 371 Date: Apr. 25, 1989

§ 102(e) Date: Apr. 25, 1989

[87] PCT Pub. No.: WO89/02102

PCT Pub. Date: Mar. 9, 1989

[30] Foreign Application Priority Data

Sep. 3, 1987 [JP] Japan .................. 62-220827

[51] Int. Cl.⁵ .............................................. G06F 15/46
[52] U.S. Cl. .................. 395/375; 364/262.4; 364/226.7; 364/261.1; 364/280.7; 364/DIG. 1; 364/191; 395/700
[58] Field of Search ... 364/200 MS File, 900 MS File, 364/191, 190, 192, 474.23; 395/375, 700

[56] References Cited

U.S. PATENT DOCUMENTS 3,271,743 12/1962 Craft ................................ 364/900
3,895,354 7/1975 Kish ................................. 364/900
4,165,534 8/1979 Dummeruth ...................... 364/900
4,209,847 6/1980 Noda ............................... 364/900
4,302,820 11/1981 Struger ............................. 364/900
4,396,974 8/1983 Imazeki ........................ 364/474.23
4,484,286 11/1984 Nagamine ......................... 364/900
4,490,781 12/1984 Kishi ............................... 364/191
4,513,366 4/1985 Munekata ...................... 364/474.2
4,591,968 5/1986 Nozawa ............................ 364/191
4,636,938 1/1987 Broome ........................... 364/191
4,697,249 9/1987 Kishi ............................... 364/190
4,750,105 6/1988 Ohkawa ....................... 364/474.23
4,797,811 1/1989 Kiyokawa ......................... 364/200
4,814,999 3/1989 Kawamura ..................... 364/474.2
4,821,201 4/1989 Kawamura ..................... 364/474.2
4,835,700 5/1989 Tanaka ............................ 364/190

Primary Examiner—Thomas C. Lee
Assistant Examiner—Eric Gleman
Attorney, Agent, or Firm—Staas & Halsey

[57] ABSTRACT

An NC program output method is disclosed which includes: storing a starting character string (SP₁), which indicates the beginning of an inputted NC program, in a starting character string input memory (M₁); enabling setting of a separate starting character string (SP₂); and selectively outputting, before NC data (D₁) which results from editing processing, the stored starting character string (SP₁) or the separately set starting character string (SP₂). If where the starting character string (SP₂) is not set, then the starting character string (SP₁) is outputted automatically.

5 Claims, 5 Drawing Sheets

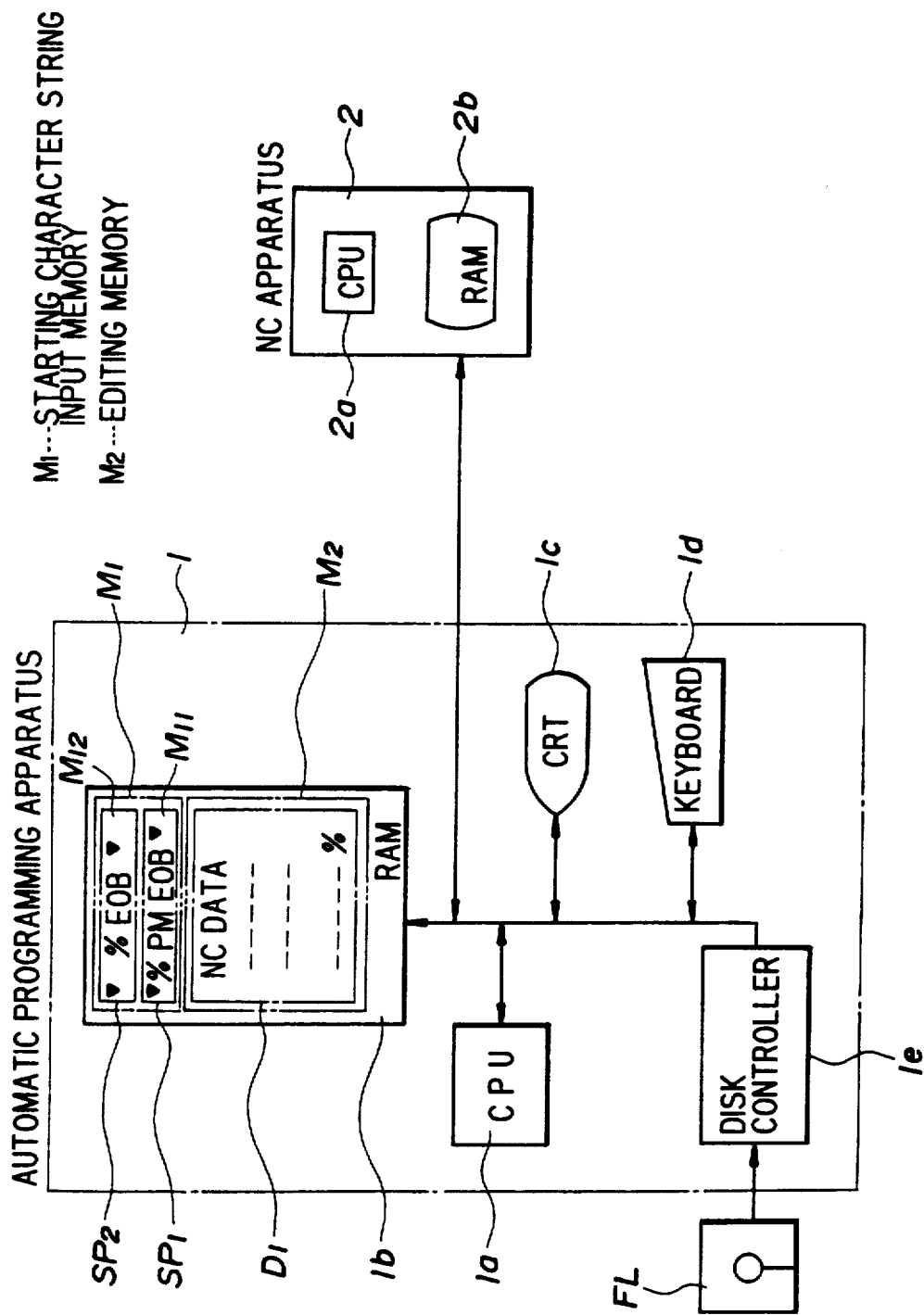

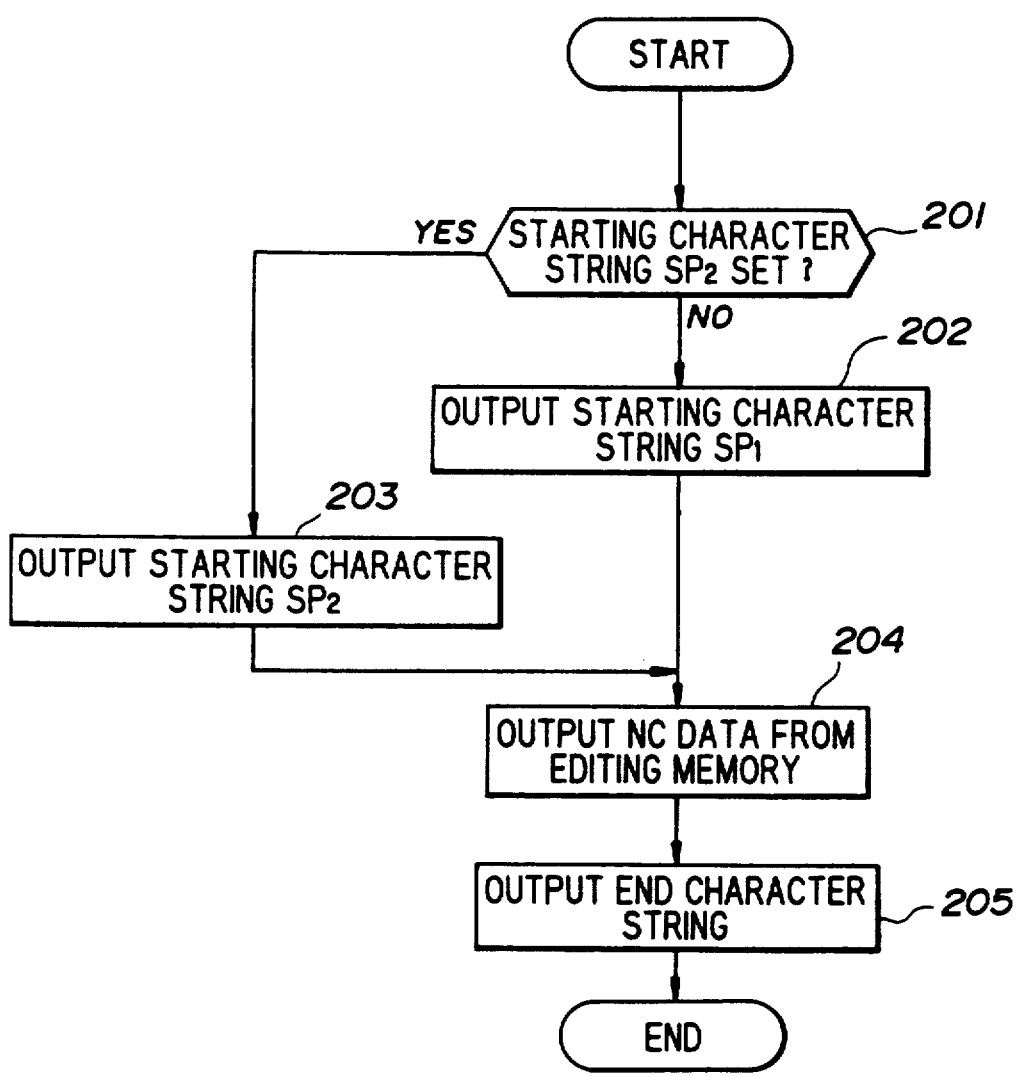

SYSTEM FOR CHANGING AN NC PROGRAM STARTING CHARACTER STRING TO ONE RECOGNIZABLE TO A PARTICULAR NC APPARATUS

TECHNICAL FIELD

This invention relates to an NC program output method and, more particularly, to a method of outputting an entered NC program upon subjecting the NC program to predetermined editing processing.

BACKGROUND ART

There are occasions in which a predetermined NC program is inputted to an automatic programming apparatus, a new NC program is created by subjecting the NC program to editing processing such as processing for adding, deleting or revising NC data, and the new program is delivered as an output. FIG. 5 is a view for describing a conventional NC program output method of this kind. An NC program is composed of a starting character string [e.g., %EOB (end of block)] indicating the beginning of NC data, a group of NC data and finally an end character string (e.g., %) indicating the end of NC data. There are cases where the starting character string differs depending upon the NC apparatus.

When an NC program PR is read in, an automatic programming apparatus skips the starting character string "%EOB", which is irrelevant to the operation of an NC apparatus, stores data from NC data D in an editing memory RAM, outputs the initially preset starting character string "%EOB" following application of predetermined editing processing such as editing, then outputs NC data D' from within the editing memory RAM, and finally outputs the end character string "%", thereby outputting a new NC program PR' which is the result of editing processing.

With this conventional NC program output method, however, the starting character string "%EOB" is inserted at the beginning of the NC program that will be outputted. Consequently, though no problems are encountered as far as an NC apparatus that regards "%EOB" as the starting character string of NC data is concerned, a problem does arise with respect to an NC apparatus that regards a different starting character string, e.g., "%PMEOB", as the starting character string, the problem being that this NC apparatus will not be capable of identifying the beginning of the NC data.

Accordingly, it has been considered to adopt an arrangement in which it is possible to set an automatic programming apparatus to any starting character string and, when the NC program is outputted, to output the set starting character string before the NC data. With this method, however, operation is troublesome because the starting character string conforming to the NC apparatus used must be set whenever an NC program is edited and outputted. Operation is particularly troublesome since a starting character string must be set even when there is agreement between a starting character string contained in an NC program inputted to an automatic programming apparatus and a starting character string of an NC apparatus that uses the edited NC program.

SUMMARY OF THE INVENTION

Accordingly, an object of the present invention is to provide an NC program output method through which an NC program having any starting character string can be outputted by a simple operation.

The NC program output method of the invention includes storing a starting character string, which indicates the beginning of an inputted NC program, in a starting character string input memory, enabling setting of a separate starting character string, and selectively outputting, before NC data which results from editing processing, the stored starting character string or the separately set starting character string. In a case where a starting character string is not set, a starting character string contained in the inputted NC program is outputted automatically.

BRIEF DESCRIPTION OF THE DRAWINGS

FIG. 1 is a block diagram of a system for practicing the method of the present invention;

FIGS. 2(a) and 2(b) are flowcharts of processing according to the method of the invention;

DESCRIPTION OF THE PREFERRED EMBODIMENT

FIG. 1 is a block diagram of an automatic programming system for practicing the method of the present invention. Numeral 1 denotes a computerized automatic programming apparatus, 2 a computerized NC apparatus, 1a, 1b, 1c, 1d and 1e a processor, a RAM, a graphic display unit (CRT), a keyboard and a disk controller within the automatic programming apparatus 1, respectively, and 2a, 2b a processor and a RAM within the NC apparatus 2, respectively.

The method of the present invention includes: storing a starting character string $SP_1$, which indicates the beginning of an inputted NC program, in a starting character string input memory $M_1$; enabling setting of a separate starting character string $SP_2$; and selectively outputting, before NC data $D_1$ which results from editing processing, the stored starting character string $SP_1$ or the separately set starting character string $SP_2$. In a case where the starting character string has not been not set, the starting character string $SP_1$ is outputted automatically.

Figure 2A:
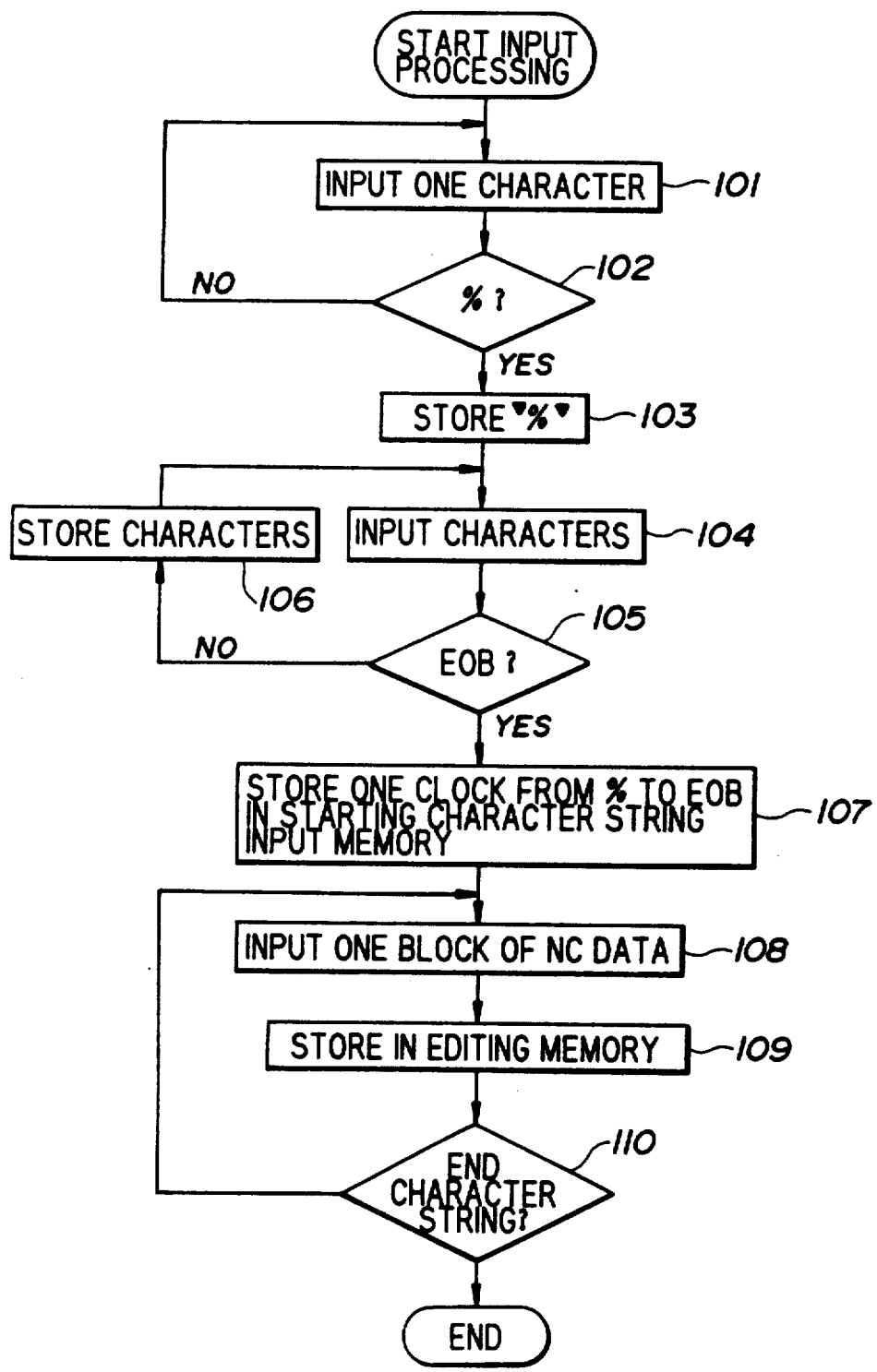

FIG. 2(a) is a flowchart of NC program input processing in the method of the present invention. Input processing will now be described in accordance with the flowchart of FIG. 2(a).

Figure 3:
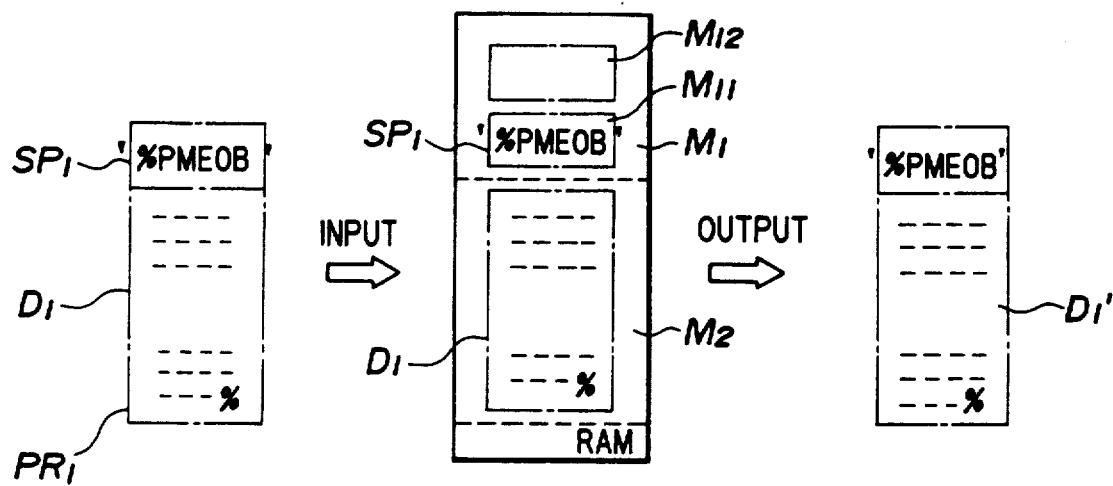
FIGS. 3 and 4 are views for describing the method of the invention.

First, the processor 1a reads the initial character of an NC program $PR_1$ (see FIG. 3) from a floppy FL (step 101), and determines whether the initial character is "%" (step 102). If the initial character is not "%", processing from step 101 onward is repeated until "%" appears. If the initial character is "%", then "%" is stored in RAM 1b (step 103).

Next, the characters that follow "%" are read (step 104) and it is determined whether the read characters are "EOB", which indicate the end of one block (step 105). If the characters are not "EOB" (e.g., if the following character is "P"), then the read character "P" is stored in RAM 1b (step 106) and processing from step 104 onward is repeated until "EOB" appears. If "EOB"

appears, then one block from "%" to "EOB" (e.g., "%PMEOB") is stored as the starting character string $SP_1$ in a first storage area $M_{11}$ of the starting character string input memory $M_1$ in RAM 1b (step 107).

When reading of the starting character string $SP_1$ ends, one block of the NC data $D_1$ is read (step 108) and stored in an editing memory $M_2$ of RAM 1b (step 109). Next, it is determined whether the stored block of NC data is "%", which indicates an end character string (step 110). If the character string is not "%", then processing from step 108 onward is repeated until "%" appears. If the character string is "%", input processing is terminated.

When the input of the NC program ends, the operator manipulates the automatic programming apparatus to subject the NC data $D_1$ to predetermined editing processing such as revision processing and output the edited new NC program to the NC apparatus 2 or an external storage medium such as a floppy via the disk controller 1e.

Figure 4:
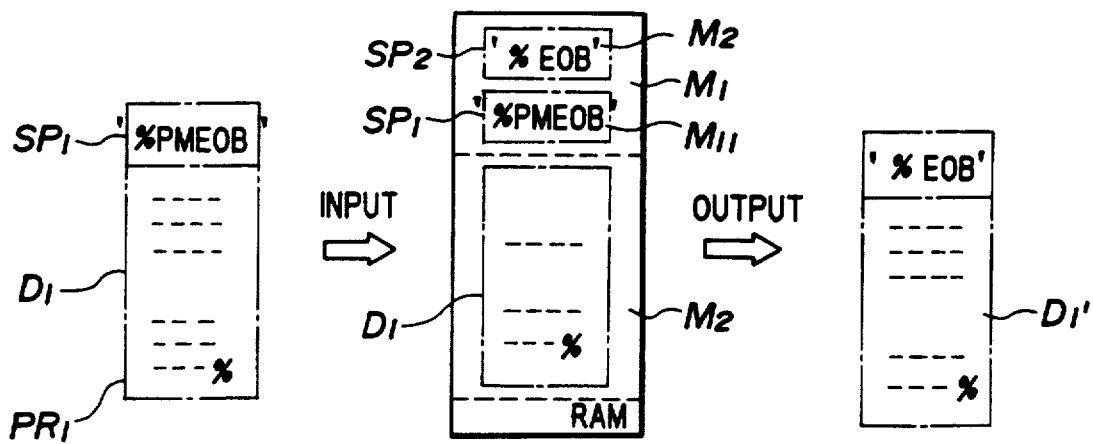
Figure 5:
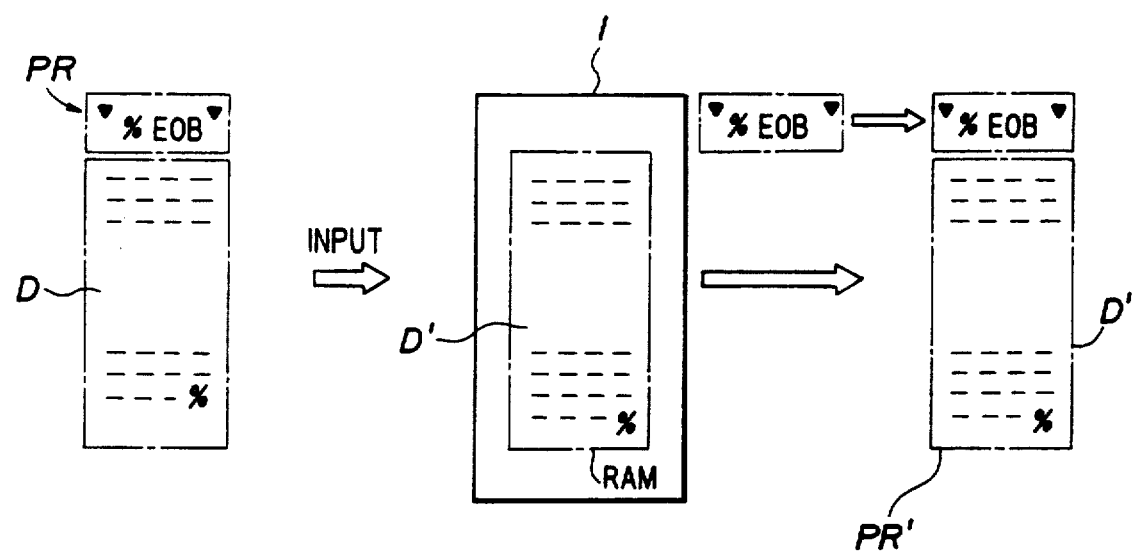
FIG. 5 is a view for describing an example of the prior art.

FIG. 2(b) is a flowchart of NC program output processing according to the method of the invention. Output processing will now be described in accordance with the flowchart of FIG. 2(b). Before the edited new NC program is outputted, the operator checks to see whether there is agreement between the starting character string $SP_1$ stored in the first storage area $M_{11}$ of the starting character string input memory $M_1$ and the starting character string of the NC apparatus which is to use the outputted NC program. If they do not agree, the starting character string $SP_2$, e.g., "%EOB", of the NC apparatus is inputted from the keyboard 1d and set in a second storage area $M_{12}$ of the starting character address string input memory $M_1$ (see FIG. 4). If the two character strings agree, a starting character string is not set by the keyboard 1d and the second storage area $M_{12}$ of the starting character string input memory $M_1$ is left blank (see FIG. 3).

If an NC program output key is operated in this state, the processor 1a of the automatic programming apparatus 1 checks to see whether the starting character string $SP_2$ has been set in the second storage area $M_{12}$ of the starting code character string input memory $M_1$ (step 201).

If the starting character string $SP_2$ has not been set, then the starting character string $SP_1$ (e.g., "%PMEOB") that has been set in the first storage area $M_{11}$ of the starting character string input memory $M_1$ is outputted (step 202). If the starting character string $SP_2$ has been set, then this starting character string $SP_2$ (%EOB) is outputted (step 203).

Thereafter, the processor 1a outputs the edited NC data $D_1'$ from the editing memory $M_2$ (step 204), and then outputs the final character string "%" (step 205). to terminate output processing. It should be noted that although processing proceeds after the check at step 201 to determine whether the starting character string $SP_2$ has been set in the second storage area $M_{12}$ of the starting character string input memory $M_1$, it is permissible to set, from the keyboard 1d, which of the starting character strings $SP_1$, $SP_2$ is outputted and then proceed with processing based on this setting. Further, although the NC program inputted to the automatic programming apparatus 1 initially contains the starting character string "%PMEOB" in the foregoing description, the method of the invention is not limited to such a case, for the method is fully applicable to cases in which the starting character string possesses the format "%□□ .. . □ EOB". Ordinarily, the character code string does possess such a format.

In accordance with the present invention as described above, it is arranged to store a starting character string, which indicates the beginning of NC data contained in an inputted NC program, enable setting of a separate starting character string, and selectively output, before NC data which results from editing processing, the stored starting character string or the separately set starting character string. Therefore, in a case where there is agreement between a starting character string contained in the inputted NC program and a starting character string of an NC apparatus that uses a new NC program resulting from editing processing, starting character strings need not be set one by one. It will suffice to set a starting character string only in case of non-agreement. This simplifies the operation for setting starting character strings.

We claim:

1. An NC program output method for outputting an entered NC program for an NC apparatus upon subjecting the NC program to predetermined editing processing in an automatic programming apparatus including a memory and an output unit, comprising the steps of:

storing in the memory a first character string which indicates a beginning point in the entered NC program;

conditionally storing in the memory a second character string recognizable to the NC apparatus which indicates the beginning point in the entered NC program indicated by the first character string;

selectively outputting from the memory one of the first character string and the second character string to the output unit, in dependence upon the second character string being stored; and outputting the entered NC program to the output unit after outputting one of the first character string or the second character string.

2. An NC program output method according to claim 1, further comprising the step of:

in a case where the second character string has not been stored, outputting the first character string contained in the entered NC program.

3. An NC program output method according to claim 2, further comprising the step of:

in a case where the second character string has been stored, outputting from the memory the second character string to the output unit.

4. An NC program output method according to claim 1, further comprising the step of:

in the case where the first character string includes comprising "% ... EOB", storing in the memory "% ... EOP" when the NC program is entered.

5. An NC program output method according to claim 4, further comprising the step of:

entering said second character string from a keyboard.

* * * * *